US008523686B2

(12) United States Patent
Goujet

(10) Patent No.: US 8,523,686 B2
(45) Date of Patent: Sep. 3, 2013

(54) FLEXIBLE COUPLING MEANS

(75) Inventor: Damien Goujet, Sausset les Pins (FR)

(73) Assignee: Eurocopter, Marignane Cedex (FR)

( * ) Notice: Subject to any disclaimer, the term of this patent is extended or adjusted under 35 U.S.C. 154(b) by 11 days.

(21) Appl. No.: 13/232,286

(22) Filed: Sep. 14, 2011

(65) Prior Publication Data
US 2012/0077607 A1 Mar. 29, 2012

(30) Foreign Application Priority Data

Sep. 27, 2010 (FR) ...................... 10 03800

(51) Int. Cl.
*F16D 3/52* (2006.01)
(52) U.S. Cl.
USPC .......................................................... 464/79
(58) Field of Classification Search
USPC ...................... 464/78–80, 174, 175; 277/636; 138/DIG. 11
See application file for complete search history.

(56) References Cited

U.S. PATENT DOCUMENTS

| 500,722 | A | | 7/1893 | Richard | |
|---|---|---|---|---|---|
| 3,063,266 | A | * | 11/1962 | Rabson | ........................... 464/174 |
| 3,095,714 | A | | 7/1963 | Schlotmann | |
| 3,988,906 | A | | 11/1976 | Smith | |
| 4,492,384 | A | * | 1/1985 | Herschelman | ................ 277/636 |
| 7,591,754 | B2 | * | 9/2009 | Duong et al. | ................ 464/79 X |
| 2006/0079335 | A1 | * | 4/2006 | Muskus et al. | ................... 464/79 |
| 2009/0140497 | A1 | * | 6/2009 | Roberts et al. | ................. 277/636 |

FOREIGN PATENT DOCUMENTS

| DE | 4445413 | A1 | | 7/1996 | |
|---|---|---|---|---|---|
| EP | 0459352 | A1 | | 12/1991 | |
| EP | 1936233 | A2 | | 6/2008 | |
| FR | 1020765 | A | | 2/1953 | |
| FR | 1.257.395 | | * | 2/1961 | ...................... 464/80 |
| FR | 1536141 | A | | 8/1968 | |
| GB | 212124 | | * | 3/1924 | ...................... 464/79 |
| GB | 389907 | A | | 3/1933 | |
| GB | 1091121 | A | | 11/1967 | |
| WO | 9010801 | A1 | | 9/1990 | |

OTHER PUBLICATIONS

Search Report and Written Opinion; Application No. FR 1003800; dated Apr. 4, 2011.

* cited by examiner

*Primary Examiner* — Gregory Binda
(74) *Attorney, Agent, or Firm* — Brooks Kushman P.C.

(57) ABSTRACT

A coupling means (10) extending along a longitudinal axis of symmetry (100) from a first plate (11) towards a second plate (12), which plates are connected together by a link member (20). Said link member (20) is provided with a first hub (21) secured to said first plate (11) and with a second hub (22) secured to said second plate (12), a first end section (21') of the first hub (21) being connected to a second end section (22') of the second hub (22) by link means (30), said link means (30) comprising a first web (31) connecting said first end section (21') to a maximum section (33) of said link means (30), said link means (30) having a second web (32) connecting a second end section (22') of said second hub (22) to said maximum section (33).

20 Claims, 2 Drawing Sheets

FLEXIBLE COUPLING MEANS

CROSS REFERENCE TO RELATED APPLICATIONS

This application claims the benefit of FR 10 03800 filed on Sep. 27, 2010, the disclosure of which is incorporated in its entirety by reference herein.

BACKGROUND OF THE INVENTION (1) Field of the Invention

The present invention relates to flexible coupling means that can accommodate angular and axial offsets, serving in particular to connect together two mechanical members, for example a transmission shaft and a mechanical part such as a rotorcraft turbine engine.

Consequently, the invention lies in the technical field of transmitting power from one mechanical member to another, in particular mechanical members of a rotorcraft.

(2) Description of Related Art

Most presently-constructed rotorcraft are fitted with at least one free turbine engine. Power is then taken from a low pressure stage of the free turbine, which stage is mechanically independent of the compressor assembly and the high pressure stage of the turbine engine. The free turbine of a turbine generally rotates at a speed lying in the range 20,000 revolutions per minute (rpm) to 50,000 rpm, so a speed-reducing gearbox is needed in order to connect it to the main rotor of the rotorcraft, since it has a speed of rotation that lies substantially in the range 200 rpm to 400 rpm: this is a main power transmission gearbox commonly referred to as the main gearbox (MGB).

Under such circumstances, the turbine engine is connected to the main gearbox of the rotorcraft via at least one transmission shaft that rotates about its own axis of rotation at a speed that is often greater than 5000 rpm.

Similarly, a rotorcraft generally includes a tail rotor in order to compensate the yaw reaction moment due to the main rotor being driven mechanically and in order to enable the rotorcraft to be controlled in yaw.

Consequently, at least one power transmission shaft is arranged between the main gearbox and a tail gearbox for reducing speed in order to drive the tail rotor. Such a transmission shaft must also be capable of rotating at a speed that is greater than 5000 rpm.

Given the speeds of rotation, the transmission shaft needs to be securely fastened by coupling means to the mechanical members it serves to connect together.

Furthermore, the coupling means must enable the transmission shaft to transfer the power developed by one mechanical member to another mechanical member under conditions that are extreme, specifically when the members that are connected together are not correctly aligned relative to each other.

In order to combat the vibration that is generated by the rotating assemblies, rotorcraft are provided with antivibration devices.

Consequently, the main gearbox and possibly even the engine of the rotorcraft are fitted with antivibration devices. Thus, the main gearbox and the engines may possibly be free to move relative to the structure of the rotorcraft, in order to limit the vibration that they generate.

The transmission shafts arranged on those mechanical members must therefore be capable of operating in spite of those movements, in particular vertical movements that give rise to losses of alignment between the members in question relative to each other.

Document FR 1 020 765 discloses coupling means capable of accommodating that type of misalignment.

The coupling means comprise a plurality of annular members of U-shaped axial section. Each annular member includes two vertical plates that face each other and that are provided with a circular attachment.

A first annular member that is provided with a vertical plate provided with a first circular attachment is then connected to a second annular member that is provided with a vertical plate provided with a second circular attachment, by fastening the first circular attachment to the second circular attachment using bolts and lock nuts.

The coupling means are then arranged between two rotary mechanical members, a turbine engine and a transmission shaft, for example.

When one of the mechanical members moves, the coupling means deform so that the mechanical members do not jam. For example, a turbine engine thus continues for example to drive the transmission shaft and thus the main gearbox of a rotorcraft, even in the event of the mechanical members being misaligned. Naturally, the potential misalignment may possibly be restricted to within predetermined limits.

Document U.S. Pat. No. 500,722 presents coupling means provided with two end plates in the form of disks that are connected together by a single curved annular hub.

The coupling means may be made as a single piece. It is possible to obtain those coupling means by forming a groove in a block of material.

Although effective and attractive, it should be observed that those coupling means may be difficult to prepare.

In order to accommodate angular misalignment, the diameter of the hub may be minimized. Nevertheless, that means that the coupling means are no longer capable of transmitting a high level of torque.

One solution then consists in reinforcing the small diameter hub by maximizing its thickness.

Nevertheless such reinforcement has a non-negligible impact on weight.

The technological background also includes the following documents: DE 4 445 413 A1; GB 1 091 121 A; GB 389 907 A; FR 1 536 141 A; U.S. Pat. No. 3,095,714 A; EP 0 459 352 A1; WO 90/10801A1; U.S. Pat. No. 3,988,906 A; and EP 1 936 233 A2.

SUMMARY OF THE INVENTION

An object of the present invention is thus to propose alternative coupling means serving to transmit a high level of torque while accommodating angular misalignment.

According to the invention, a coupling means in one-piece i.e. providing with a monobloc body, extend along a longitudinal axis of symmetry from a first plate towards a second plate, the first plate and the second plate being connected together by a hollow link member defining an inside space. Each plate may include an end attachment, possibly a circular end attachment, suitable for being fastened to another coupling means or indeed to a mechanical member.

The invention is remarkable in particular in that the link member is provided with a first hub secured to the first plate and a second hub secured to the second plate, a first end section of the first hub being connected to a second end section of the second hub by link means, the link means comprising a first web connecting the first end section to a maximum section of the link means, the link means having a second web connecting a second end section of the second hub to the maximum section, the maximum section being the portion of the link member that is transversely furthest away from the longitudinal axis of symmetry.

Thus, the invention uses two hubs linked together by a "maximum section" section, the distance between the maximum section and the longitudinal axis of symmetry in a transverse direction perpendicular to said longitudinal axis of symmetry being greater than the distance between each of the hubs and said longitudinal axis of symmetry in such a transverse direction.

Consequently, the coupling means comprise a coupling zone of large dimension at the maximum section. The coupling means then enable a high level of torque to be transmitted in rotation about the longitudinal axis of symmetry.

Furthermore, the hubs conserve sections that are small relative to the maximum section. Thus, the hubs are capable of deforming angularly.

Consequently, the coupling means are capable of accommodating angular deformations while transferring a high level of torque, and they manage to do this without possessing great weight.

It should also be observed that it is possible to machine the coupling means by eliminating material so as to obtain one-piece coupling means. More particularly, the coupling means may be made by a turning operation that is relatively simple and inexpensive.

In addition, since the coupling means comprise a single piece, the coupling means do not include any welds. The coupling means can then be made using materials that are difficult to assemble together by welding, such as titanium and aluminum alloys, in particular. Furthermore, fabrication of the coupling means does not involve a step of inspecting a weld bead.

This fabrication technique is made even easier when at least one of the webs is frustoconical in shape, and in particular when both webs are frustoconical in shape.

The presence of two hubs and of link means confers a relatively great length between the end plates of the coupling means. Under such circumstances, it is easy to perform such machining.

The invention may also include one or more of the following additional characteristics.

In an aspect of the invention, at least one of the plates is orthogonal to the longitudinal axis of symmetry.

In another aspect of the invention, the first end section describes a ring having a first diameter centered on the longitudinal axis of symmetry, the second end section describes a ring having a second diameter centered on the longitudinal axis of symmetry, and the maximum section is a ring having a maximum diameter centered on the longitudinal axis of symmetry that is greater than the first diameter and than the second diameter.

Furthermore, the first hub may be a ring in which each section presents the same first diameter and/or the second hub is a ring in which each section presents the same second diameter.

Furthermore, the first web may present a first thickness that varies going from the first end section towards the maximum section and/or the second web presents a second thickness that varies going from the second end section towards the maximum section.

It should be observed that the term "thickness" is used to mean the distance between the inside wall of each element facing said inside space and an outside wall of each element facing outwards from said coupling means.

In addition, the varying thickness may be less than a constant thickness of each hub.

In order to ensure that the maximum section is the section of the link means furthest from the longitudinal axis of symmetry, each web may extend longitudinally along the longitudinal axis of symmetry from an end section of a hub towards the other web going away from the longitudinal axis of symmetry in order to join the maximum section.

The webs thus vary longitudinally on going towards each other and away from the longitudinal axis of symmetry.

In a first embodiment, at least one web is frustoconical in shape.

In a second embodiment, at least one web is a cylinder obtained by using a curved generator line having a shape that is convex facing towards the inside space.

In a third embodiment, at least one web is a cylinder obtained by using a curved generator line having a shape that is convex facing towards the inside space.

Furthermore, the coupling means may include protection means for protecting the webs against impacts, e.g. an elastomer sleeve.

BRIEF DESCRIPTION OF THE DRAWINGS

The invention and its advantages appear in greater detail from the context of the following description of embodiments given by way of illustration and with reference to the accompanying figures, in which.

Elements present in more than one of the figures are given the same references in each of them.

DETAILED DESCRIPTION OF THE PREFERRED EMBODIMENTS

It should be observed that three mutually orthogonal directions X, Y, and Z are shown in the figures.

The first direction X is referred to as the "longitudinal" direction.

The second direction Y is referred to as the "transverse" direction. The term "width" relates to a transverse dimension of the device in this transverse direction.

Finally, the third direction Z is also a transverse direction. The term "thickness" relates to an elevation dimension of the device in this third direction in the figures.

Figure 1:
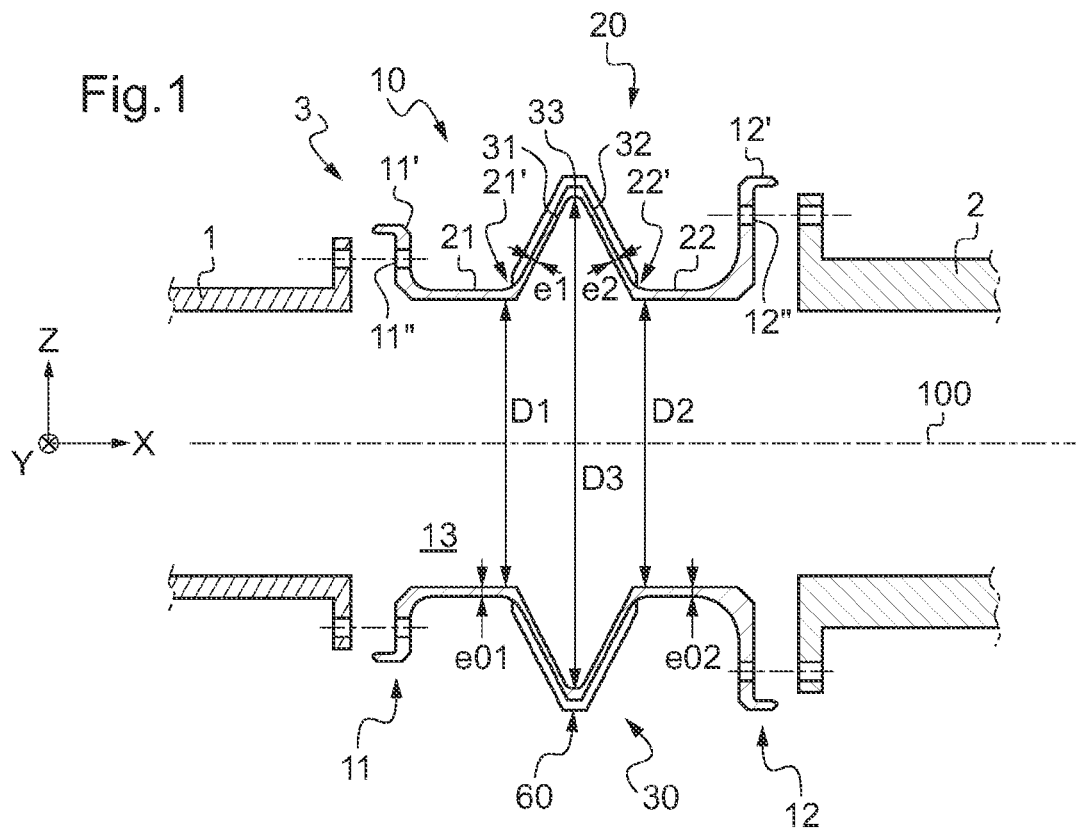
FIG. 1 is a cross-section of a preferred, first embodiment of coupling means.

FIG. 1 shows a coupling device 3 for connecting together two mechanical members 1 and 2, e.g. two transmission shafts.

The coupling device 3 is provided with coupling means 10 extending along a longitudinal axis of symmetry 100. Nevertheless, it should be understood that the coupling device 3 could have a plurality of coupling means 10 arranged in series.

The coupling means 10 comprise a first plate 11 fitted with an end attachment 11' at its periphery for fastening to a first mechanical member 1, for example. Thus, the first plate 11 may be a disk provided with a circular attachment 11' having a plurality of holes 11" suitable for co-operating with bolts, for example.

Similarly, the coupling means 10 includes a second plate 12 provided with an end attachment 12' at its periphery for fastening to a second mechanical member 2, for example. Thus, the second plate 12 may be a disk provided with a circular attachment 12' having a plurality of holes 12'' suitable for co-operating with bolts, for example.

The first plate 11 and the second plate 12 are preferably orthogonal to their longitudinal axis of symmetry 100.

In a variant, each plate may have a plurality of arms extending radially relative to a longitudinal axis of symmetry, for example.

Furthermore, the coupling means 10 possess a hollow link member 20 defining an inside space 13, this link member 20 connecting the first and second plates 11 and 12 together.

Unlike document U.S. Pat. No. 500,722 the link member does not have a single hub.

On the contrary, the link member 20 is provided with a first hub 21 secured to the first plate 11 and a second hub 22 secured to the second plate 12. Under such circumstances, the link member 20 comprises link means 30 connecting together the first hub 21 and the second hub 22.

More precisely, the link means 30 are provided with a first web 31 and a second web 32 connected together by a maximum section 33. The first hub 21 then extends from one end fastened to the first plate 11 towards a first end section 21' fastened to the first web 31, the second hub 22 extending from one end fastened to the second plate 12 towards a second end section 22' fastened to the second web 32.

Consequently, along the longitudinal axis of symmetry 100, the coupling means 10 comprise in succession: a first plate 11; a first hub 21; a first web 31 of the link means 30; a maximum section 33 of the link means 30; a second web 32 of the link means 30; a second hub 22; and then a second plate 12.

Furthermore, the maximum section 33 is the portion of the link member 20 that is transversely furthest away from the longitudinal axis of symmetry 100, i.e. in a direction perpendicular to the longitudinal axis of symmetry 100. Thus, the minimum distance between the maximum section 33 and said longitudinal axis of symmetry 100 is greater firstly than the minimum distance between the first hub 21 and said longitudinal axis of symmetry 100, and secondly than the minimum distance between the second hub 22 and said longitudinal axis of symmetry 100.

For example, the first hub 21 and thus the first end section 21' are rings centered on the longitudinal axis of symmetry 100 and they present a first diameter D1. Similarly, the second hub 22 and thus the second end section 22' are optionally rings centered on the longitudinal axis of symmetry 100 and they present a second diameter D2.

The maximum section 33 is then annular in shape, being centered on the longitudinal axis of symmetry 100, the maximum section 33 presenting a third diameter D3 that is greater than the first diameter D1 and than the second diameter D2.

It should be observed that the first diameter D1 and the second diameter D2 may be equal.

Furthermore, the first web may present a first thickness e1 that varies, i.e. that is not constant, on going from the first end section 21' towards the maximum section 33. Similarly, the second web 22' may present a second thickness e2 that varies going from the second end section 22' towards the maximum section 33.

Each varying thickness e1, e2 is optionally less than a constant thickness e01, e02 of each hub 21, 22.

Because of their dimensions, the link means 30 are in danger of being subjected to impacts against external elements. Under such circumstances, the coupling means optionally possess protection means 60 for protecting the link means 30, e.g. a sleeve made of an elastic material.

Furthermore, each web extends so as to go towards the other web firstly longitudinally along the longitudinal axis of symmetry 100, and secondly transversely so as to go away from said longitudinal axis of symmetry 100.

Each web may correspond to a cylinder obtained by moving a generator line around the associated end section.

In the first embodiment shown in FIG. 1, the generator line is a segment presenting an angle of inclination lying in the range 0° to 90° relative to a straight line parallel to said longitudinal axis of symmetry 100.

Under such circumstances, the web is frustoconical in shape.

Figure 2:
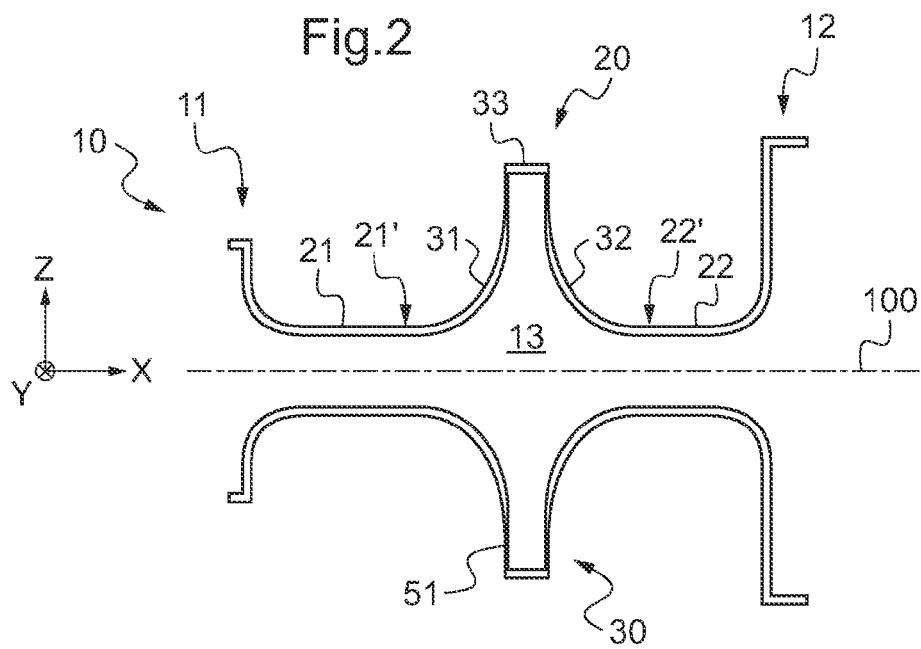
FIG. 2 is a cross-section of a second embodiment of coupling means.

In a second embodiment as shown in FIG. 2, the generator line is a curve 51 having a shape that is convex towards the inside space 13, e.g. a parabola.

Figure 3:
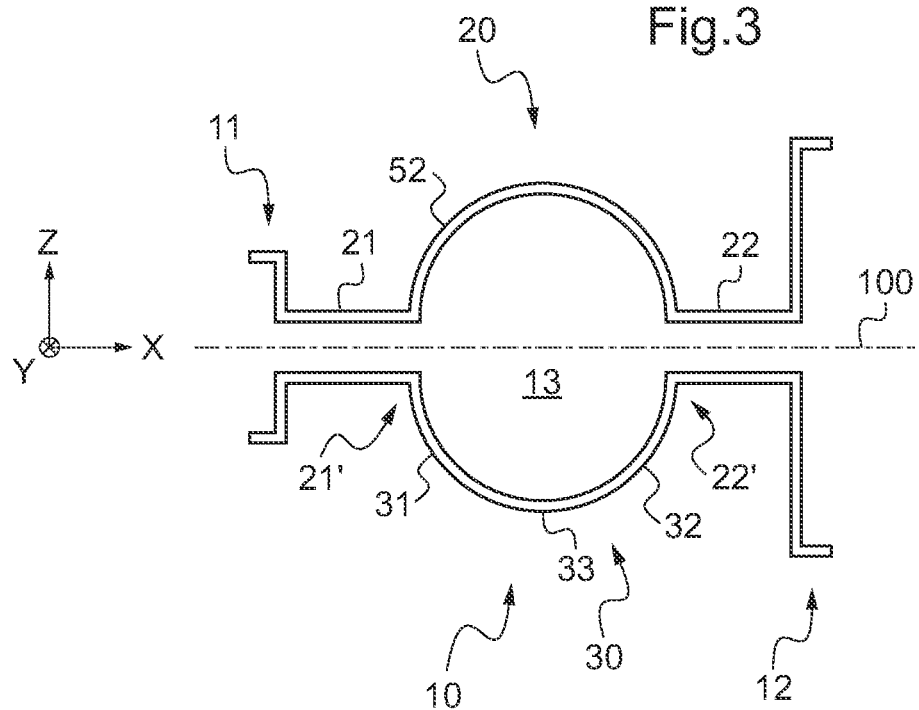
FIG. 3 is a cross-section of a third embodiment of coupling means.

In the third embodiment shown in FIG. 3, the generator line is a curve 52 presenting a shape that is concave facing towards the inside space 13.

Figure 4:
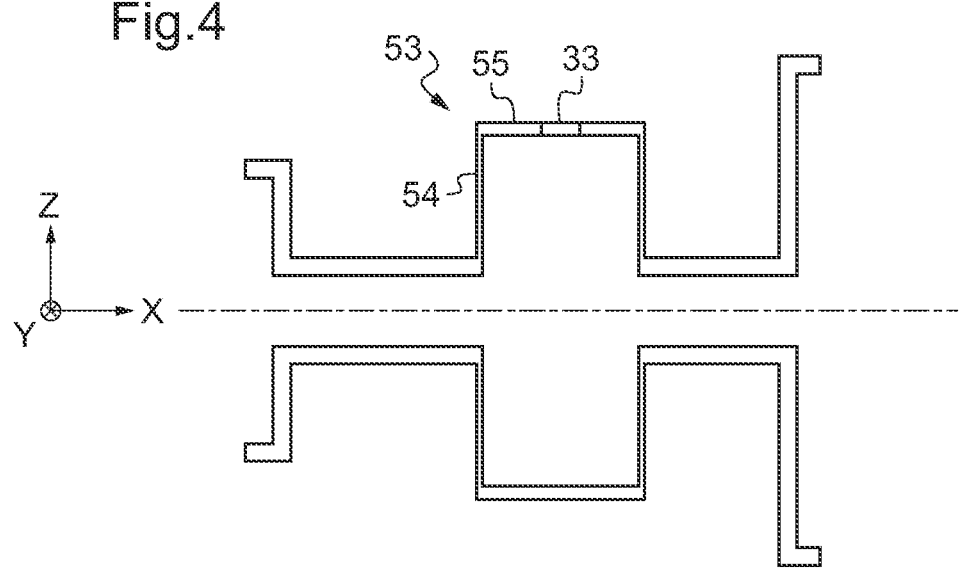
FIG. 4 is a cross-section of a fourth embodiment of coupling means.

In a fourth embodiment shown in FIG. 4, the generator line is provided by a bent line 53. This bent line 53 may comprise a first segment 54 extending transversely, more precisely radially, relative to the longitudinal axis of symmetry 100, followed by a second segment 54 that extends parallel to the longitudinal axis of symmetry 100.

Independently of the embodiment, it is possible to obtain the coupling means by machining a single block of material, by chemical machining or indeed by a turning operation.

Nevertheless, it is possible to fabricate certain elements separately and then to secure them to one another, e.g. by welding operations.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A one-piece coupling means comprising:
   a first plate extending along a longitudinal axis of symmetry towards a second plate;
   the first plate and the second plate being connected together by a hollow link member defining an inside space;
   wherein the link member is provided with a first hub secured to the first plate and a second hub secured to the second plate, a first end section of the first hub being connected to a second end section of the second hub by link means;
   the link means comprising a first frustoconical web connecting the first end section to a maximum section of the link means, the link means having a second frustoconical web connecting the second end section of the second hub to the maximum section; and
   the maximum section being the portion of the link member that is transversely furthest away from the longitudinal axis of symmetry.

2. A coupling means according to claim 1, wherein at least one of the plates is orthogonal to the longitudinal axis of symmetry.

3. A coupling means according to claim 1, wherein the first end section describes a ring having a first diameter (D1) centered on the longitudinal axis of symmetry, the second end section describes a ring having a second diameter (D2) centered on the longitudinal axis of symmetry, and the maximum section is a ring having a maximum diameter (D3) centered on the longitudinal axis of symmetry that is greater than the first diameter (D1) and than the second diameter (D2).

4. A coupling means according to claim 1, wherein the first hub is a ring in which each section presents a first diameter (D1) and/or the second hub is a ring in which each section presents a second diameter (D2).

5. A coupling means according to claim 1, wherein the first frustoconical web presents a first thickness (e1) that varies going from the first end section towards the maximum section.

6. A coupling means according to claim 1, wherein the second frustoconical web presents a second thickness (e2) that varies going from the second end section towards the maximum section.

7. A coupling means according to claim 1, wherein the first frustoconical web presents a first thickness (e1) that varies going from the first end section towards the maximum section and the second frustoconical web presents a second thickness (e2) that varies going from the second end section towards the maximum section.

8. A coupling means according to claim 7, wherein the varying thickness (e1, e2) is less than a constant thickness (e01, e02) of each hub.

9. A coupling means according to claim 1, including protection means to protect the webs against impacts.

10. A coupling means according to claim 1, wherein each web extends longitudinally from an end section of a hub going away from the longitudinal axis of symmetry in order to join the maximum section.

11. A rotable coupling member for coupling rotable shafts, the rotable member comprising:
a first plate extending orthogonally to a longitudinal axis of symmetry, the first plate having a plurality of radially spaced fastener holes;
a second plate extending orthogonally to the longitudinal axis of symmetry and spaced from the first plate, the second plate having a second plurality of radially spaced fastener holes;
the first plate and the second plate being connected together by a hollow link member defining an inside space;
wherein the link member is provided with a first hub secured to the first plate and a second hub secured to the second plate, a first end section of the first hub being connected to a second end section of the second hub by a web link comprising a first frustoconical web connecting the first end section to a maximum section of the link and a second frustoconical web connecting the second end section of the second hub to the maximum section; and the maximum section being the portion of the link member that is transversely furthest away from the longitudinal axis of symmetry.

12. The rotable coupling member of claim 11, wherein the maximum section has a diameter that is greater than a diameter of the first end section and a diameter of the second end section.

13. The rotable coupling member of claim 11, wherein the first hub has a first thickness, the second hub has a second thickness, the first web has a third thickness, and the second web has a fourth thickness, the first thickness being greater than each of the third thickness and the fourth thickness and the second thickness being greater than each of the third thickness and the fourth thickness.

14. The rotable coupling member of claim 13, wherein the first thickness is constant, the second thickness is constant, the third thickness varies from the first end section to the maximum section, and the fourth thickness varies from the second end section to the maximum section.

15. The rotable coupling member of claim 11, further comprising a protective layer covering the maximum section.

16. The rotable coupling member of claim 15, wherein the protective layer includes an elastic sleeve.

17. The rotable coupling member of claim 11, wherein the first plate, second plate, first hub, second hub, first web, second web, and maximum section are integrally formed of metal.

18. A one-piece coupling comprising:
a first plate extending orthogonally to a longitudinal axis of rotational symmetry;
a second plate extending orthogonally to the longitudinal axis of rotational symmetry spaced from the first plate;
a hollow link member connecting the first plate and the second plate together, the hollow link member defining an inside space, the hollow link member having a first hub secured to the first plate and a second hub secured to the second plate, the first hub having a first end section and the second end having a second end section; and
a web link connecting the first end section of the first hub to the second end section of the second hub, the web link comprising a first frustoconical web, a second frustoconical web, and a maximum section connecting the first web to the second web, the maximum section being the portion of the web link that is transversely furthest away from the longitudinal axis of rotational symmetry.

19. The one-piece coupling of claim 18, wherein the first plate is a disk having an attachment plane, the disk including a plurality of fastener holes.

20. The one-piece coupling of claim 18, wherein the first plate, second plate, first hub, second hub, first web, second web, and maximum section are integrally formed of metal.

* * * * *